Figure 1:
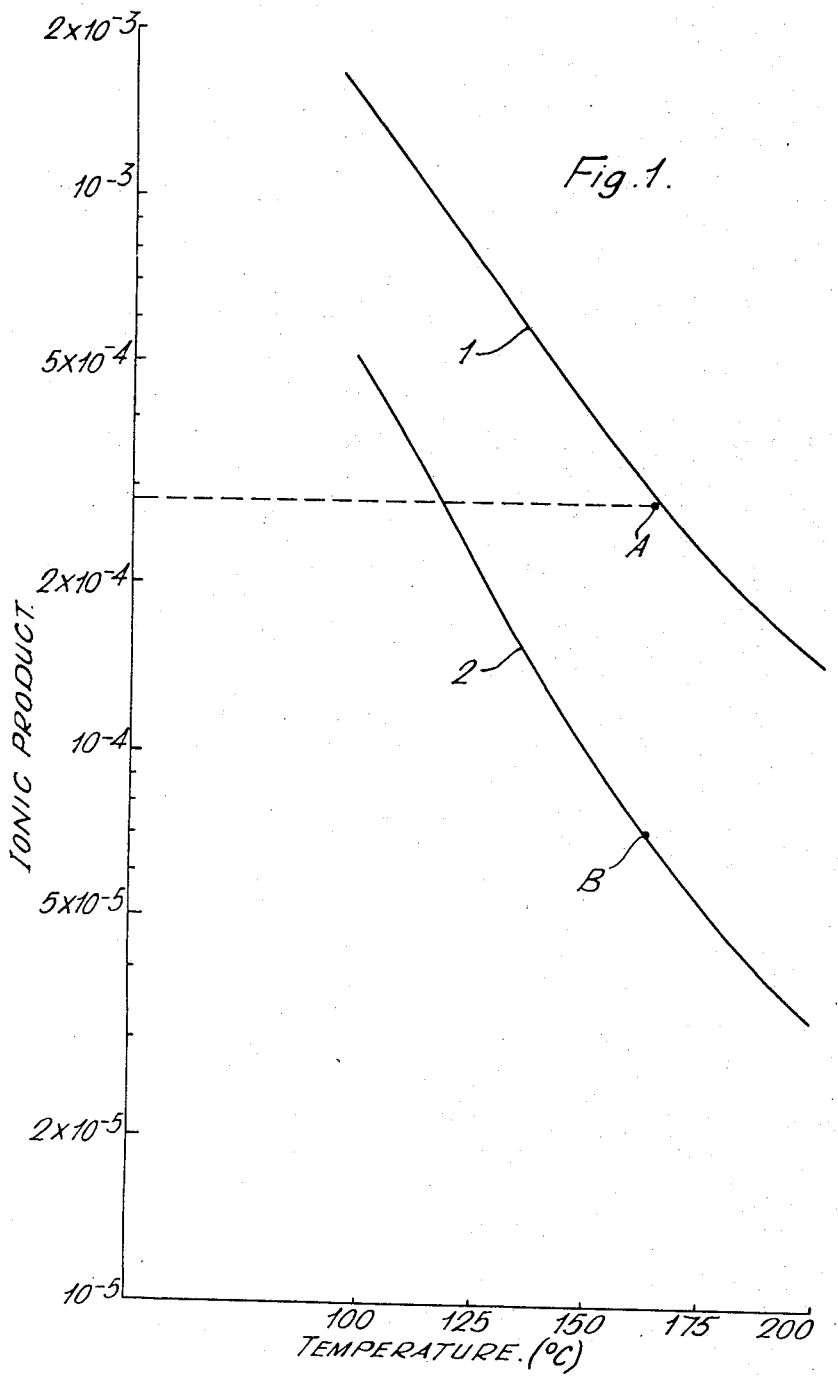

United States Patent Office 3,377,273
Patented Apr. 9, 1968

3,377,273
PROCESS AND APPARATUS FOR DESALINATION OF AN AQUEOUS SOLUTION CONTAINING CALCIUM SULPHATE
Eugen Glueckauf, Didcot, England, assignor to United Kingdom Atomic Energy Authority, London, England
Filed Feb. 14, 1966, Ser. No. 527,183
Claims priority, application Great Britain, Feb. 17, 1965, 6,877/65
11 Claims. (Cl. 210—46)

The present invention relates to the desalination of aqueous solutions and is particularly, but not exclusively, concerned with desalination of sea-water by distillation.

Sea-water has been proposed as a source of fresh water which is suitable for drinking and other uses. Prior to such use however, the large concentration of salts dissolved in sea-water must be removed by a desalination process. Distillation has been suggested as a possible method for this desalination and this distillation could be effected using heat from a nuclear reactor. One of the difficulties associated with the distillation of sea-water is caused by the presence of dissolved calcium sulphate in the water. The calcium sulphate is deposited as a scale during the distillation at temperatures in excess of about 125° C. and it has not proved possible to prevent such scale formation by reducing the pH of the sea-water.

It is the object of the present invention to provide a new or improved process for the desalination of aqueous solutions containing calcium sulphate.

According to the present invention there is provided a process for the desalination of an aqueous solution containing calcium sulphate comprising a preliminary stage to reduce the calcium sulphate concentration and a final stage comprising a distillation process wherein the preliminary stage comprises heating the aqueous solution to a temperature at which the calcium sulphate content of the solution exceeds the solubility of anhydrous calcium sulphate and is less than the solubility of calcium sulphate hemihydrate and removing some of the calcium sulphate by passing the heated solution through a bed of anhydrous calcium sulphate.

According to a further aspect of the present invention there is provided an apparatus for the desalination of aqueous solutions comprising a first vessel adapted to contain a bed of anhydrous calcium sulphate, solution inlet means in said first vessel, heater means associated with said solution inlet means, solution outlet means in said first vessel remote from said inlet means, an evaporation vessel having a distilled water outlet means and a concentrated solution outlet means and means connecting the solution outlet of the first vessel to the evaporation vessel.

Anhydrous calcium sulphate ($CaSO_4$) is also known as anhydrite and calcium sulphate hemihydrate ($2CaSO_4 \cdot H_2O$) may conveniently be referred to as "the hemihydrate."

The present invention is based on the different stabilities and solubilities of the hemihydrate and anhydrite.

Calcium sulphate possesses three crystalline forms, anhydrite, the hemihydrate, and calcium sulphate dihydrate, $CaSO_4 2H_2O$ (gypsum). At the temperatures used in the process of the present invention, gypsum is unstable and the only forms of interest are the hemihydrate and anhydrite.

The hemihydrate has a greater solubility product than anhydrite, and will precipitate from saturated solution at temperatures above 107° C. The hemihydrate is unstable and, at these temperatures, changes very slowly to the stable form which is anhydrite.

Anhydrite, although less soluble than the hemihydrate, will not precipitate from a solution which is saturated relative to anhydrite unless seeding is provided. Thus, although a solution may be supersaturated with respect to anhydrite, no precipitation of any form of calcium sulphate will occur until the solubility of the hemihydrate is exceeded, when the hemihydrate will crystallise out. However, if a solution supersaturated with respect to anhydrite is passed into contact with a bed of anhydrite, the calcium sulphate is removed from solution as the anhydrite. By this means the concentration of calcium sulphate may be reduced in a single operation by a factor of about 3, depending on the temperature at which such a treatment is effected.

The treated solution is then highly unsaturated with respect to the hemihydrate and this solution may then be concentrated quite considerably by distillation without precipitation of the hemihydrate occurring.

A larger concentration factor may be obtained if the preliminary stage is effected in two steps, the second step being at a higher temperature than the first. In such a case, after passage through the bed of anhydrous calcium sulphate, the solution is heated to a higher temperature and passed through a further bed of anhydrous calcium sulphate prior to the distillation process.

If the present invention is applied to the desalination of sea-water, the sea-water should be heated to a temperature in the range 113–167° C. before being passed into the bed of anhydrite. This temperature restriction is a result of the natural calcium sulphate concentration of sea-water since below 113° C., no anhydrite would be deposited whilst about 167° C., the hemihydrate would precipitate. It is desirable to approach the upper temperature limit as closely as possible since this provides the greatest amount of calcium sulphate removal and for sea-water it is preferred to use a temperature of about 165° C. for a single step preliminary stage. If a two step preliminary step is used, the temperature of the first step may be 150° C., and that of the second may be 200° C., to reduce the calcium sulphate concentration by a factor of about 5.

It will be observed that using sea-water, the temperature of the preliminary stage is in excess of 100° C. and thus will have to be carried out under pressure. In general, the process of the present invention is carried out under pressure at temperatures which may be in excess of 150° C. The temperature used in the preliminary stage of the process must be such that the concentration of calcium sulphate in the solution being treated does not exceed the solubility product of the hemihydrate at that temperature. It will be appreciated that the concentrations of calcium and sulphate ions in the solution may be different, and the term "concentration of calcium sulphate' should be understood to mean "the product of the concentrations of calcium and sulphate ions." Preferably, the temperature of the preliminary stage is such that the concentration of calcium sulphate is only slightly less than the solubility product of the hemihydrate at the particular temperature. As noted for the particular case of sea-water, under these conditions the reduction in calcium content is near the maximum possible without causing precipitation of the hemihydrate.

The temperature of the distillation stage is dependent on the calcium content of the solution from the preliminary stage, the amount of water recovery desired and the speed at which it is desired to effect the distillation. Conveniently the distillation may be carried out at about the same temperature as the preliminary stage and may be effected using a flash distillation technique.

The method of the present invention may be applied to the desalination of any aqueous solution in which calcium sulphate is present and is not only applicable to the desalination of sea-water. It will be realised that the present invention is applicable only to those solutions in which calcium is present as calcium sulphate and that hardwater in which the hardness is caused solely by other calcium salts, e.g., calcium carbonate, should not be treated by the present method. If calcium carbonate is present in the solution, deposition of the carbonate may be prevented by slightly acidifying the solution with a suitable acid, e.g., hydrochloric or sulphuric acid.

Figure 2:
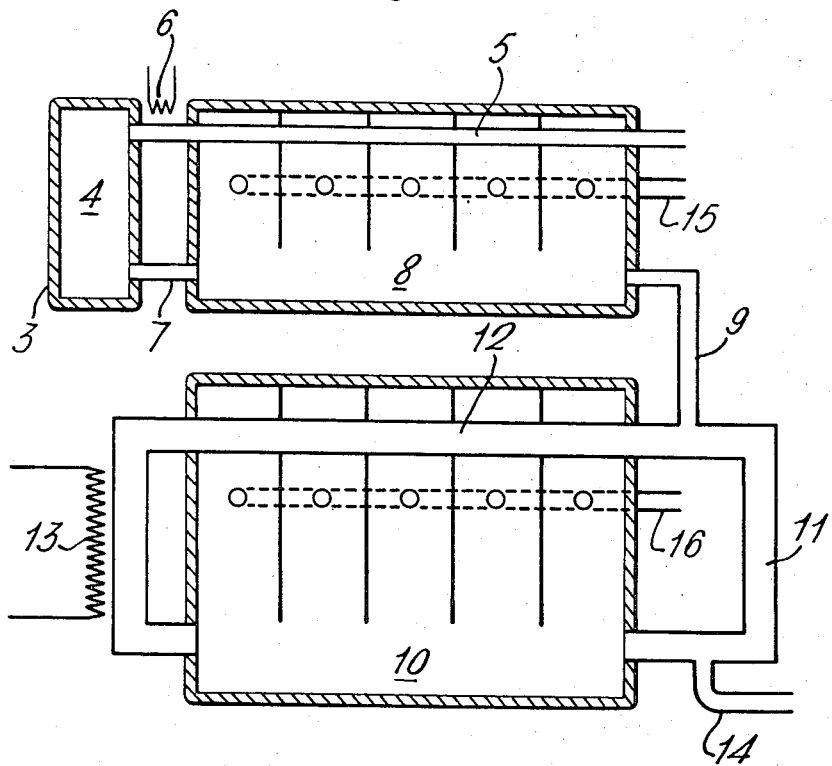

The present invention will now be described by way of example with reference to the desalination of sea-water, and also to the accompanying drawings wherein:

FIGURE 1 is a graph showing the variation with temperature of the solubility products of anhydrite and the hemihydrate in sea-water; and FIGURE 2 is a diagrammatic representation of an apparatus for effecting desalination of sea-water.

Referring to FIGURE 1, the temperature is plotted on a linear scale and the ionic product on a logarithmic scale. Curve 1 shows the variation of the solubility product of the hemihydrate in the temperature range 100–200° C. whilst curve 2 is a similar curve for anhydrite. The horizontal dashed line represents the calcium sulphate concentration of sea-water (approximately $2.8 \times 10^{-4}$).

Thus, above a temperature of about 113° C., sea-water is super-saturated with respect to anhydrite. However, no precipitation occurs since anhydrite will not itself precipitate without seeding. At a temperature of about 167° C., the solubility product of the hemihydrate is reached and at temperatures in excess of this, calcium sulphate will precipitate as the hemihydrate and subsequently convert to the anhydrite. If the sea-water is heated to a temperature above 113° C. and below 167° C., the solution will be super-saturated relative to anhydrite and unsaturated relative to the hemihydrate. On passing such heated sea-water over a bed of anhydrite, calcium sulphate will be precipitated as anhydrite due to the seeding effect of the anhydrite bed. It will be clear that the higher the temperature in the specified range, the greater the amount of anhydrite precipitated and the smaller the concentration of calcium sulphate remaining in the solution. Furthermore, the less calcium sulphate in the treated liquid, the more it will be possible to concentrate the solution during the distillation treatment, thereby giving a high recovery of pure water. A temperature of 165° C., corresponding to the point A in FIGURE 1, for the preliminary stage would result in about 75% of the calcium sulphate being removed as anhydrite when the solution was passed through the bed of anhydrite. The concentration of calcium sulphate remaining in solution would be equivalent to the solubility of anhydrite in sea-water at 165° C., which is about $0.72 \times 10^{-4}$, see point B in FIGURE 1.

The solution obtained from the preliminary treatment could then be distilled at any desired temperature. However, reference to FIGURE 1 indicates quite clearly that the lower the temperature the greater the extent by which the solution may be concentrated. If distillation is effected at 165° C., the solution may be concentrated by a factor of four, before the solubility product of the hemihydrate at 165° C. is exceeded. Above and below 165° C., the solubility product is less and greater respectively than 165° C. and the concentration factors possible at these temperatures are similarly less and greater than at 165° C.

When it is desired to operate at temperatures higher than 165° C., or to concentrate sea-water with a higher concentration factor than 4, or both, it is necessary to carry out the treatment with anhydrite at higher temperatures. To do this, may require two stages of anhydrite equilibration, as untreated sea-water cannot be heated above 165° C. without risking the precipitation of the hemihydrate. As an example, one might heat sea-water to 150° C., equilibrate with anhydrite at 150° C., remove any anhydrite fines, then reheat to 200° C. and equilibrate with anhydrite at this temperature. The resulting solution will then be capable of being evaporated to a 5 fold concentration at 200° C. without calcium sulphate precipitation.

It will be appreciated that with a concentration factor of $n$ during the distillation stage, the final volume of the solution is about $100/n\%$ of its original volume and $100(n-1)/n\%$ of the water is obtained as a pure product.

It will be appreciated that sea-water having a lower initial calcium sulphate concentration may be heated to a temperature in excess of 165° C. in the preliminary stage of the process, whilst sea-water having a higher initial calcium sulphate concentration should be heated to a temperature lower than 165° C. during the preliminary stage. It should be appreciated that similar considerations apply to other solutions containing calcium sulphate.

The apparatus shown in FIGURE 2 comprises a vessel 3 containing a bed of anhydrite 4, an inlet conduit 5, a heating element 6 associated with the conduit 5, an outlet conduit 7 leading to a small flash evaporation vessel 8, through which the inlet conduit 5 passes in heat exchange, and a further large flash evaporation vessel 10. The conduit 9 joins with a recycle conduit 11 from the evaporation vessel 10 and the combined conduits pass as a heating conduit 12 first in heat exchange relationship through the vessel 10 and then in association with a heating element 13, before the conduit 12 opens into the vessel 10. A waste conduit 14 leads off from the recycle conduit 11. The vessels 8 and 10 are provided with conduits 15 and 16 for the withdrawal of a condensed product (distilled water) from these vessels.

The sea water to be distilled is introduced into the apparatus through the conduit 5 in which it is heated in heat exchange relationship with the contents of evaporation vessel 8 to a temperature of about 160° C. The heating element 6 raises the sea water temperature to about 165° C. and the liquid then passes into the anhydrite bed 4 in which the calcium sulphate concentration is reduced to give an ionic product of about $0.72 \times 10^{-4}$. The solution then passes to the evaporation vessel 8 in which some water distills off, condenses in the upper part of the vessel 8 and is removed through the conduit 15. The remaining solution passes through conduit 9 into the heating conduit 12 in which the temperature is raised to 160° C. by heat exchange with the contents of the evaporation vessel 10. The heating element 13 raises the temperature still further to 165° C. and the solution passes into the larger evaporation vessel 10. Here further distillation occurs and the distilled water obtained by condensation in the upper part of the vessel 10 is removed through the conduit 16. The concentrated solution remaining passes out through the recycle conduit 11 and the bulk of it is recycled. A small quantity of concentrated brine is withdrawn through the conduit 14 as waste. The amount of concentrated brine passing from the system along conduit 14 will be such that there is no build up of the total amount of dissolved salt present in the system. It will be appreciated that there will be a build-up of precipitated calcium sulphate within the system, in the anhydrite bed 5, but the quantity of other salts present should remain constant.

The evaporation vessel 8, which operates without recycle, ensures that any traces of anhydrite carried from the bed 4 redissolve in the cooler parts of the vessel 8 before entering the concentrated solution from the conduit 11 and causing precipitation of further anhydrite from the concentrated solution.

If desired, the evaporation vessel 8 could be replaced by a heat exchanger whereby a distilled water product would be obtained from the evaporation vessel 10 only.

I claim:

1. A process for the desalination of an aqueous solution containing calcium sulphate comprising the steps of reducing the concentration of calcium sulphate in the aqueous solution and distilling the solution having a reduced calcium sulphate concentration, where the steps of reducing the calcium sulphate concentration comprise heating the aqueous solution to a temperature at which the concentration of calcium sulphate in the solution exceeds the solubility of anhydrous calcium sulphate but is less than the solubility of calcium sulphate hemihydrate and reducing the calcium sulphate concentration by passing the heated solution through a bed of anhydrous calcium sulphate prior to effecting the distillation step.

2. The process of claim 1 wherein the passage of the solution through the bed of anhydrous calcium sulphate and the subsequent distillation of the solution are effected at the same temperature.

3. The process of claim 1 wherein the solution is distilled using a flash distillation process.

4. The process of claim 1 wherein when the aqueous solution is sea-water, the sea-water is heated to a temperature in the range 113–167° C. before passing such heated sea-water through the bed of anhydrous calcium sulphate.

5. The process of claim 4 wherein the sea-water is heated to a temperature of about 165° C.

6. The process of claim 1 wherein after being passed through the bed of anhydrous calcium sulphate, the solution is heated to a higher temperature and passed through a further bed of anhydrous calcium sulphate prior to being distilled.

7. The process of claim 6 wherein the solution is heated to a temperature of about 150° C., passed through the bed of anhydrous calcium sulphate, heated to a higher temperature of about 200° C. and passed through the further bed of anhydrous calcium sulphate.

8. Apparatus for the desalination of aqueous solutions comprising a first containing vessel for a bed of anhydrous calcium sulphate, a solution inlet means in said first vessel, a heater means associated with said solution inlet means, a solution outlet means in said first vessel remote from said inlet means, an evaporation vessel having a distilled water outlet means and a concentrated solution outlet means, and means connecting the solution outlet of the first containing vessel to the evaporation vessel.

9. The apparatus of claim 8 also including an intermediate evaporation vessel between the first containing vessel and the evaporation vessel.

10. The apparatus of claim 8 wherein the evaporation vessel is a flash distillation apparatus.

11. The apparatus of claim 8 also including a second containing vessel for a bed of anhydrous calcium sulphate, a connection between such second containing vessel and said first containing vessel outlet and heater means associated with said conection whereby said second containing vessel operates at a higher temperature than the said first containing vessel.

References Cited

UNITED STATES PATENTS

| | | | |
|---|---|---|---|
| 445,537 | 2/1891 | Bunnell | 210—56 |
| 1,251,486 | 1/1918 | Doherty | 210—56 |
| 1,399,845 | 12/1921 | Bull | 203—7 X |
| 2,979,442 | 4/1961 | Badger | 203—7 |
| 3,026,261 | 3/1962 | Mayfield et al. | 210—56 |

MICHAEL E. ROGERS, *Primary Examiner.*